(12) United States Patent
Nauta et al.

(10) Patent No.: US 6,741,304 B2
(45) Date of Patent: May 25, 2004

(54) DISPLAY DEVICE

(75) Inventors: Tore Nauta, Eindhoven (NL); Antonius Hendricus Maria Holtslag, Eindhoven (NL); Dirk Jan Broer, Eindhoven (NL); Hendrik De Koning, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 47 days.

(21) Appl. No.: 09/944,299

(22) Filed: Aug. 31, 2001

(65) Prior Publication Data

US 2002/0063817 A1 May 30, 2002

(30) Foreign Application Priority Data

Sep. 11, 2000 (NL) .......................................... 00203129

(51) Int. Cl.⁷ ............................................. G02F 1/1335
(52) U.S. Cl. .......................................... 349/65; 349/61
(58) Field of Search .............................. 349/61, 65, 196, 349/96, 73, 74

(56) References Cited

U.S. PATENT DOCUMENTS

| 5,103,328 A | * | 4/1992 | Numao | 349/74 |
| 5,686,979 A | * | 11/1997 | Weber et al. | 349/96 |
| 2002/0030772 A1 | * | 3/2002 | Nauta et al. | 349/61 |

FOREIGN PATENT DOCUMENTS

| EP | 0327392 A2 | 8/1989 | G02F/1/133 |
| JP | 62119518 | * 5/1987 | G02F/1/01 |
| WO | WO9701789 | 1/1997 | G02F/1/1335 |

* cited by examiner

Primary Examiner—Tarifur R. Chaudhury
Assistant Examiner—Jeanne A. Di Grazio

(57) ABSTRACT

Display device based on the scanning window principle, in which light loss in segments of the optical shutter element (21) is prevented by using reflective polarizers (35, 36).

14 Claims, 2 Drawing Sheets

DISPLAY DEVICE

CROSS-REFERENCES TO RELATED APPLICATIONS

This application claims priority benefit under 35 U.S.C. §119 from European Patent Application 00203129.2, filed on Sep. 11, 2000.

BACKGROUND AND SUMMARY

1. Technical Field

The invention relates to a display device comprising a display panel having a first light-transmissive substrate provided with electrodes at the area of pixels arranged in rows and columns, a second light-transmissive substrate and liquid crystalline material between the two substrates, an illumination system situated on the side of the second substrate remote from the liquid crystalline material, said illumination system comprising a backlight and an optical shutter element provided with means for selectively transmitting light for a group of rows of pixels or a group of columns of pixels.

Display devices of this type are used in, for example, portable apparatus such as laptop computers, mobile telephones, personal organizers etc., but also in, for example, television applications.

2. Description

A display device of the type mentioned above is described in U.S. Pat. No. 5,103,328. This document shows a liquid crystal switch built up of separately switchable segments (optical shutter elements) between a flat light source (backlight) and a display panel. The liquid crystal switch is adapted in such a way that a plurality of rows of pixels of the display panel corresponds to one segment and its function is to shield pixels that are written in from the light coming from the backlight.

Each segment is coupled to one part of the switch, which part switches separately. By consecutively illuminating different, uninterrupted rows of pixels of the display panel via the associated part of the switch in such a device, scanning window applications are possible, in which the light from the backlight is presented in the form of strips. The light source emits unpolarized light which, when using, for example, a liquid crystal switch based on the twisted-nematic liquid crystal effect, is incident on a polarizer upon entrance into the switch. Polarized light of the desired polarization is passed; the other light is absorbed in the polarizer. Here, a loss of light of about 50% occurs. The light of the correct polarization is subsequently only passed by the switch segment which is opened so that a large part of this light (about 80% when using 5 segments) is absorbed in the switch (notably in the analyzer).

It is, inter alia, an object of the present invention to obviate the above-mentioned drawbacks completely or partly. To this end, a display device according to the invention is characterized in that the display device comprises at least one reflective polarizer in the light path between the backlight and the display panel.

In this application, a "reflective polarizer" is understood to mean a polarizer which, on at least one side of the reflective polarizer, transmits linearly polarized radiation (light) in the direction of polarization of the reflective polarizer and reflects linearly polarized radiation (light) perpendicularly to this direction.

Polarized light of the desired direction of polarization is transmitted by the optical shutter element at the area of the switch segment which is opened. The reflective polarizer is situated, for example, parallel to an exit face of the backlight or of an optical waveguide of optically transparent material associated with the backlight, with an exit face facing the display panel. The transmitted light preferably has the same direction of polarization as that of a polarizer on the entrance face of the display panel. This light is subsequently modulated in the display panel in which, for example, the polarization changes, which is made visible by means of a second polarizer or analyzer.

At other areas, notably when the optical shutter element is based on a birefringent effect, polarized light having a different direction of polarization is transmitted, which light is absorbed by the polarizer on the entrance face of the display panel. The light loss thereby occurring is prevented in a preferred embodiment according to the invention, which is characterized in that the display device comprises, parallel to the exit face, a second reflective polarizer between the optical shutter element and the display panel.

In a further variant, the optical shutter element is situated between the display panel and the second reflective polarizer.

Said switches usually cover a surface area having the size of the surface area of the display panel. Also the light from the backlight must cover this surface area, which does not only require more material but also imposes stringent requirements on the quality of said backlight, due to the desired uniformity. To avoid this, an advantageous embodiment of a display device according to the invention is characterized in that the optical waveguide is provided with means for coupling in light in a direction parallel to the exit face.

The light is now coupled into the optical waveguide from, for example, an edge of the optical waveguide. The light beam to be coupled in has considerably smaller dimensions than the surface area of the display panel. This surface area is now defined, for example, by the width of a light strip (which is a part of, for example, the overall height of the display panel) and the thickness of the optical waveguide (which is usually considerably smaller than, for example, the overall width of the display panel). This makes it easier to couple light of one intensity into the optical waveguide (uniform light source).

A first variant is characterized in that the illumination system comprises at least one backlight and an optical waveguide having at least one entrance face for light, while light from the backlight can be coupled in along the entrance face extending substantially transversely to the exit face, and a selectively switchable light switch is situated between the backlight and the entrance face.

The entrance face is situated, for example, along an end face of the optical waveguide extending substantially transversely to the rows, while light from the backlight can be coupled in along this end face. The selectively switchable light switch then comprises, for example, a liquid crystal switching device with a liquid crystal between two substrates, one or both of which are provided with strip-shaped electrodes. The backlight does not only have a much smaller surface area than in the conventional display device, but the light switch is also much smaller and can therefore be manufactured at lower cost. Consequently, the backlight and the light switch can be easily integrated to one assembly. Substitution of such a combination is simpler than in the known device because alignment in only one dimension is necessary. The smaller dimension also reduces the duration of the filling process. Also the use of thinner optically switchable layers is possible, so that the switching time is faster.

BRIEF DESCRIPTION OF THE DRAWINGS

In the drawings:

FIG. 2 is a diagrammatic cross-section taken on the line II—II in FIG. 1, while

The Figures are diagrammatic and not drawn to scale. Corresponding components are generally denoted by the same reference numerals.

DETAILED DESCRIPTION

Figure 1:
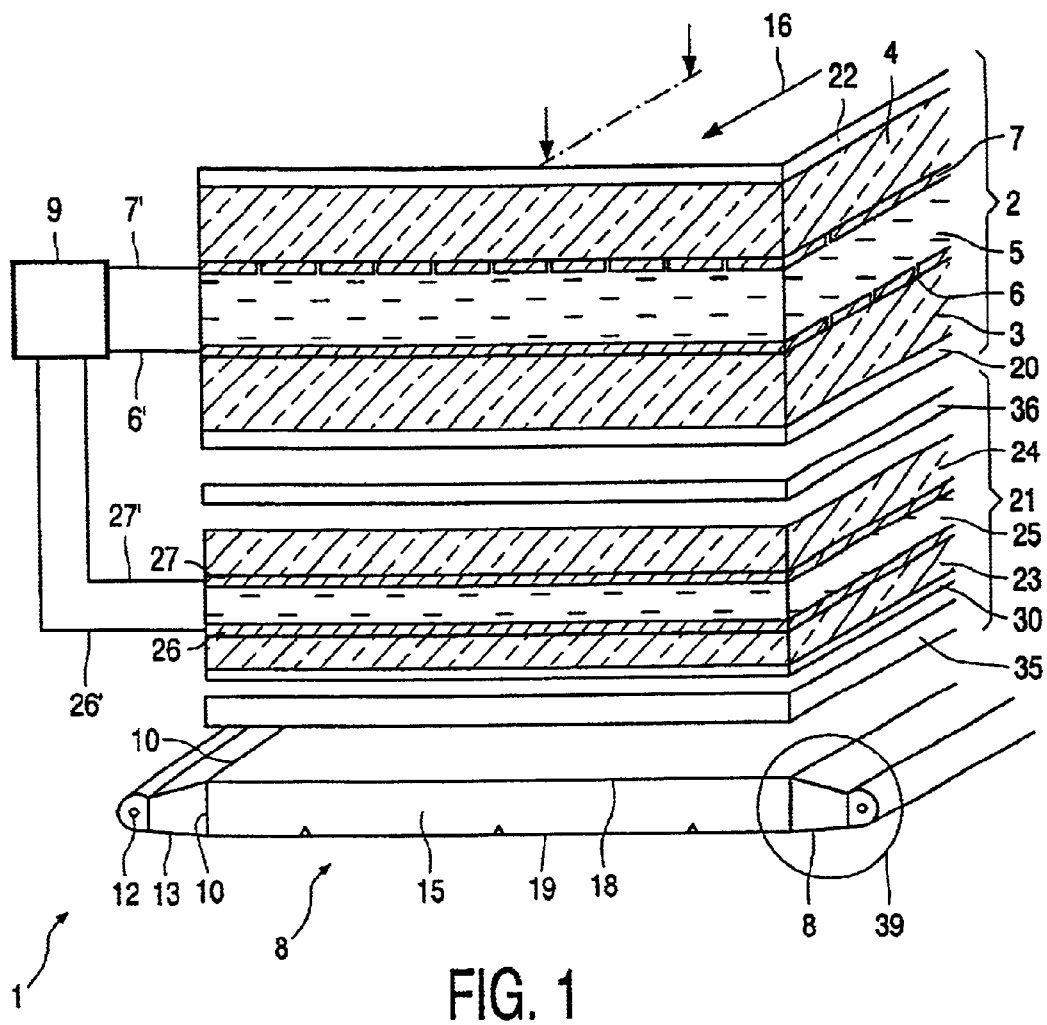
FIG. 1 is a diagrammatic perspective view of an embodiment of a display device according to the invention.
Figure 2:
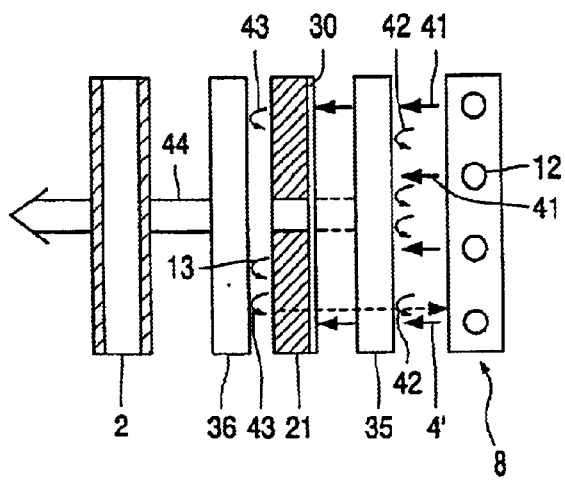

The display device 1 shown diagrammatically in FIGS. 1 and 2 comprises a display panel 2 and an illumination system 8.

The display panel 2 comprises, between two substrates 3, 4, an electro-optical material, in this embodiment a liquid crystalline material 5 whose operation is based on, for example, the twisted-nematic (TN), the supertwisted-nematic (STN) or the ferroelectrical effect for modulating the direction of polarization of light incident thereon. The display panel comprises, for example, a matrix of pixels for which transparent picture electrodes 6 are arranged on the substrate 3. The substrate 4 is light-transmissive and has light-transmissive electrodes 7 of, for example, ITO (indium tin oxide). The picture electrodes are provided with electric voltages via connection wires 6', 7' which are provided with drive voltages by means of a drive unit 9. Moreover, the display panel is customarily provided with a polarizer 20 and an analyzer 22.

In this embodiment, the illumination system 8 comprises an optical waveguide 15 made of an optically transparent material and having four end faces 10, 10'. A backlight 12 whose light is coupled into the optical waveguide 15 via the end face 10 is arranged opposite one of the end faces, for example, 10. The light source, or backlight, 12 may be, for example, a rod-shaped fluorescence lamp. The backlight may be alternatively constituted, for example, by one or more light-emitting diodes (LED), notably in flat-panel display devices having small display panels such as, for example, in portable televisions. Moreover, the backlight 12 may be detachable.

The exit face 18 of the optical waveguide 15 faces the display panel 2. Each end face 10' of the transparent plate, into which no light is coupled, may be provided with a reflector. In this way, light which is not coupled out on the exit face 18 and consequently propagates through the waveguide and reaches an end face is prevented from leaving the waveguide 15 via this end face 10'.

To avoid that light leaves the waveguide 15 without contributing to the light output of the illumination system, light from the lamp 12 is preferably coupled into the waveguide 15 via coupling-in means 13, for example, by means of a wedge-shaped optical waveguide which limits the angle of the entering beam to 15 degrees with respect to the faces 18, 19. Moreover, this enhances the contrast, because there is no scattering light.

In this embodiment, the optical waveguide 15 has a plurality of grooves 17 on the face 19. The entrance light beam is thereby reflected towards the display panel 2.

The display device 1 shown is driven in the scanning-window mode. This means that groups of row electrodes (for example, the electrodes 6) are consecutively illuminated with a beam having the width of the group of row electrodes. In this embodiment, the light beam is displaced in the direction of arrow 16.

This is achieved, for example, by means of a liquid crystal shutter 21. This shutter comprises, for example, between two substrates 23, 24, a liquid crystalline material 25 whose operation is based again on, for example, a twisted-nematic (TN), the supertwisted-nematic (STN) or the ferroelectrical effect; a fast electro-optical effect is preferably used, such as, for example, that based on an LC gel system obtained by crosslinking of LC monomers, in which a layer of polymer material switches from an absorbing state to a transparent state, and vice versa. The shutter or switch 21 comprises strip-shaped light-transmissive transparent picture electrodes 26, 27 on the light-transmissive substrates 23, 24 (in this embodiment on the inner side, but they may be alternatively provided on the outer side; use may also be made of strip-shaped electrodes on one substrate and one counter electrode on the other substrate). The (strip-shaped) electrodes are provided with electric voltages via connection wires 26', 27' which are provided with drive voltages by means of said drive unit 9. If necessary, also the shutter 21 is provided with a polarizer 30 to suppress scattering light, if any.

The drive unit 9 is adapted to be such that the strip-shaped parts of the optical shutter element corresponding to facing electrodes 26, 27 consecutively become light-transmissive (opened) after the related rows of pixels (or the columns of pixels in the case of transposed scanning) have been provided with information. In connection with a possible inertia in the liquid crystal material in the display device 2, a waiting time is preferably observed for opening the associated parts of the shutter 21.

Light in a light beam 41 (FIG. 2) from the lamp 12 comprises linearly polarized light with a direction of polarization which is parallel to that of the reflective polarizer 35 and linearly polarized light with a direction of polarization transverse thereto. The first component is therefore passed by the reflective polarizer 35 at the location of an energized segment (in this embodiment, it is assumed that the direction of polarization of the light passed by the reflective polarizer 35 and the reflective polarizer 36 to be described hereinafter is parallel to that of the polarizers 30 and 20 of the shutter 21 and the display panel 2, respectively). The other component is not passed by the reflective polarizer 35 but is reflected (arrows 42 in FIG. 2) in the direction of the lamp 12 which depolarizes the light (for example, via reflectors) and reflects it again in the direction of the reflective polarizer 35. The polarized light then generated is again partly passed by the reflective polarizer 35, etc. In this way, it is avoided that light of the second component is absorbed in the reflective polarizer 35, so that a higher light output is obtained. At the location of non-energized segments, light is passed (usually) with a direction of polarization perpendicular to that of the polarizer 35. By arranging a second reflective polarizer 36 between the light shutter 21 and the display panel 2, this light is reflected again via the light shutter 21 and the first reflective polarizer 35 (arrows 43 in FIG. 2) in the direction of the lamp 12 which depolarizes the light and reflects it again in the direction of the reflective polarizer 35. When generating the light beam 44, which is eventually passed by the opened segment and modulated by the display panel 2, no or hardly any light is lost in the composite parts of the display device.

Figure 3:
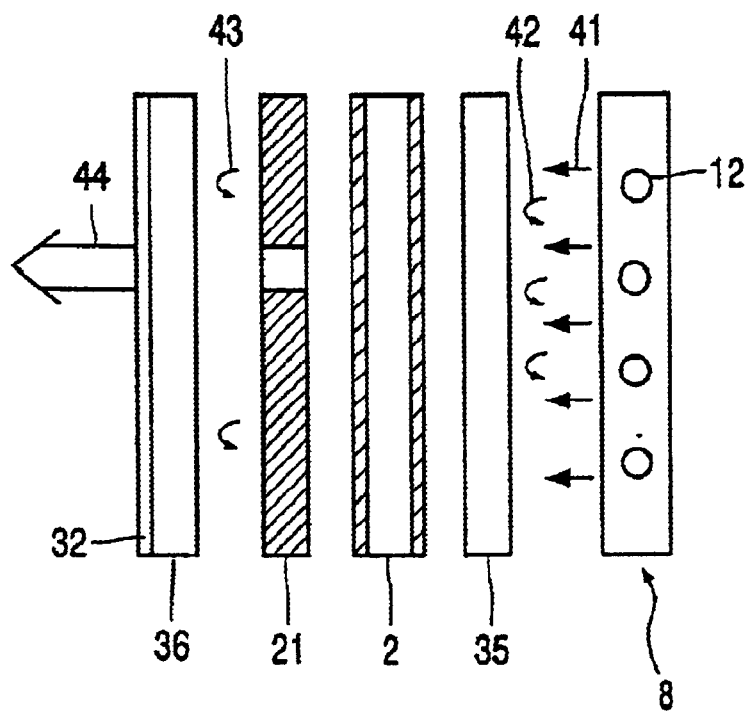
FIG. 3 shows a variant of FIG. 2.

The second reflective polarizer 36 may also be situated on the other side of the display panel 2. Yet another variant is shown in FIG. 3 in which the light first passes through the display panel 2 and then through the light shutter 21, while the combination of display panel 2 and light shutter 21 is present between the two reflective polarizers 35, 36. A polarizer 32 is now situated on the viewing side of the reflective polarizer 36.

Figure 4:
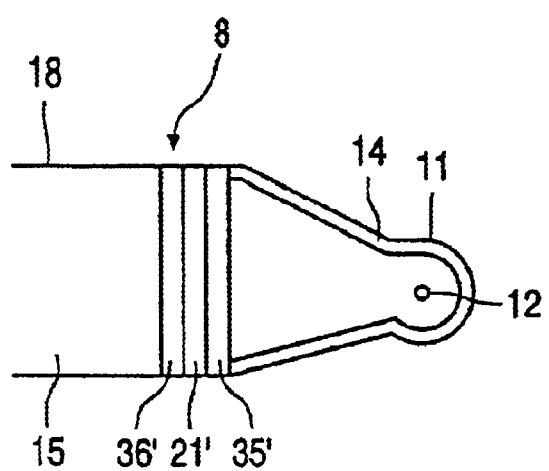
FIG. 4 is a diagrammatic perspective view of a part of a variant of FIG. 1.

The invention is of course not limited to the embodiments shown. For example, the illumination system 8 may be alternatively constituted by a flat backlight comprising one or more lamps in a lamp space covered with a flat diffuser. In the embodiment of FIG. 1, the coupling-in of light between the backlight 12 and the optical waveguide 15 can be enhanced in the same way as described above for raising the light output of the optical waveguide 15 to the display panel. This is shown diagrammatically in FIG. 4 for the part 39 in FIG. 1. An optical shutter element 21 between two reflective polarizers 35', 36' is again arranged between the backlight 12 and the optical waveguide 15. For a satisfactory operation, the lamp housing 11 preferably has a scattering mirror 14 on its inner side.

The protective scope of the invention is not limited to the embodiments shown. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "tan" preceding an element does not exclude the presence of a plurality of such elements.

We claim:

1. A display device comprising:
   a display panel having a first light-transmissive substrate provided with electrodes at the area of pixels arranged in rows and columns, a second light-transmissive substrate and liquid crystalline material between the two substrates, the pixels comprising a plurality of groups of rows of pixels and a plurality of groups of columns of pixels;
   an illumination system situated on the side of the second substrate remote from the liquid crystalline material, said illumination system comprising a backlight;
   an optical shutter element including means for selectively transmitting light for one group of rows of pixels or one group of columns of pixels at a time to consecutively illuminate the groups of rows of pixels or groups of columns of pixels; and
   at least one reflective polarizer in an optical path between the backlight and the display panel.

2. A display device as claimed in claim 1, wherein the illumination system comprises an optical waveguide of an optically transparent material having an exit face facing the display panel.

3. A display device as claimed in claim 2, wherein the display device comprises, parallel to the exit face, a reflective polarizer between the exit face and the display panel.

4. A display device as claimed in claim 2, wherein the display device comprises, parallel to the exit face, a second reflective polarizer between the optical shutter element and the display panel.

5. A display device as claimed in claim 1, wherein the optical shutter element is situated between the display panel and a second reflective polarizer.

6. A display device as claimed in claim 2, wherein the optical waveguide is provided with means for coupling in light in a direction parallel to the exit face.

7. A display device as claimed in claim 6, wherein the illumination system comprises at least one backlight and an optical waveguide having at least one entrance face for light, while light from the backlight can be coupled in along the entrance face extending substantially transversely to the exit face, and a selectively switchable light switch is situated between the backlight and the entrance face.

8. A display device as claimed in claim 7, wherein a first reflective polarizer is situated between the backlight and the selectively switchable light switch.

9. A display device as claimed in claim 8, wherein a second reflective polarizer is situated between the selectively switchable light switch and the optical waveguide.

10. A display device as claimed in claim 1, wherein the display device comprises drive means for presenting signals to data and column electrodes to write data to the pixels, and for selectively activating at any one time only a part of the optical shutter system associated with the one group of rows of pixels or the one group of columns of pixels.

11. The display device of claim 1, wherein the optical shutter is disposed in the optical path between the illumination system and the display panel.

12. The display device of claim 1, wherein the optical shutter includes a plurality of strip-shaped light transparent electrodes.

13. The display device of claim 12, wherein the each of the plurality of strip-shaped light transparent electrodes corresponds to one of the groups of rows of pixels, or one of the groups of column of pixels, in the display panel.

14. The display device of claim 13, further comprising a drive unit for driving the plurality of strip-shaped light transparent electrodes, the drive unit being adapted to consecutively drive the strip-shaped light transparent electrodes a fixed interval after data is provided to the corresponding group of rows of pixels or the corresponding group of column of pixels.

* * * * *